(12) United States Patent
Sung (10) Patent No.: US 6,407,780 B1
(45) Date of Patent: Jun. 18, 2002

(54) THIN-FILM TRANSISTOR SUBSTRATE USING ALUMINUM TO FORM LOW-RESISTANCE INTERCONNECTION AND LIQUID CRYSTAL DISPLAY DEVICE USING THE SAME

(75) Inventor: Chae Gee Sung, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/388,009

(22) Filed: Sep. 1, 1999

(30) Foreign Application Priority Data

Sep. 2, 1998 (JP) .......................................... 10-248829

(51) Int. Cl.[7] ............................................. G02F 1/136
(52) U.S. Cl. ........................................... 349/43; 438/30
(58) Field of Search ........................... 349/43, 42, 147, 349/139; 438/30; 251/59, 72

(56) References Cited

U.S. PATENT DOCUMENTS

| | | | | |
|---|---|---|---|---|
| 5,427,962 A | * | 6/1995 | Sasaki et al. ................ | 438/159 |
| 5,834,797 A | * | 11/1998 | Yamanaka .................... | 257/57 |
| 5,849,604 A | | 12/1998 | Sugawara et al. | |
| 5,852,481 A | * | 12/1998 | Hwang ........................ | 349/43 |
| 6,249,330 B1 | * | 6/2001 | Yamaji et al. ............... | 349/122 |
| 6,274,400 B1 | * | 8/2001 | Jen ............................. | 438/30 |

* cited by examiner

Primary Examiner—Kenneth Parker
(74) Attorney, Agent, or Firm—Brinks Hofer Gilson & Lione (57) ABSTRACT

A thin-film transistor substrate includes a substrate; an underlying metal film disposed on the substrate, the underlying metal film being formed of a metal capable of being electrically connected to an indium tin oxide film used to form a gate terminal, a source terminal, and a pixel electrode; an aluminum film used to form a gate interconnection, a source interconnection, and a drain electrode, the aluminum film being disposed on the underlying metal film; an aluminum oxide film disposed on the aluminum film; an insulating film disposed on the aluminum oxide film; a contact hole formed in the insulating film, the aluminum oxide film, and the aluminum film, the contact hole extending from the surface of the insulating film to the surface of the underlying metal film through the insulating film, the aluminum oxide film, and the aluminum film; and an indium tin oxide film formed on the insulating film and in the contact hole, the indium tin oxide film in the contact hole being electrically connected to the underlying metal film. In this thin-film transistor substrate, low-resistance interconnections are formed using aluminum without causing an increase in electric resistance due to direct contact between aluminum and ITO. Furthermore, short circuits and poor electric isolation due to hillocks are prevented.

15 Claims, 6 Drawing Sheets

THIN-FILM TRANSISTOR SUBSTRATE USING ALUMINUM TO FORM LOW-RESISTANCE INTERCONNECTION AND LIQUID CRYSTAL DISPLAY DEVICE USING THE SAME

BACKGROUND OF THE INVENTION

1. Field of the Invention

The present invention relates to a thin-film transistor substrate and a liquid crystal display device using the same, and more particularly, a thin-film transistor substrate using aluminum to form a low-resistance interconnection and a liquid crystal display device using such a thin-film transistor substrate.

2. Description of the Related Art

Because of its low resistance, aluminum is widely used in electronic devices to form interconnections and electrodes on a substrate.

Figure 6:
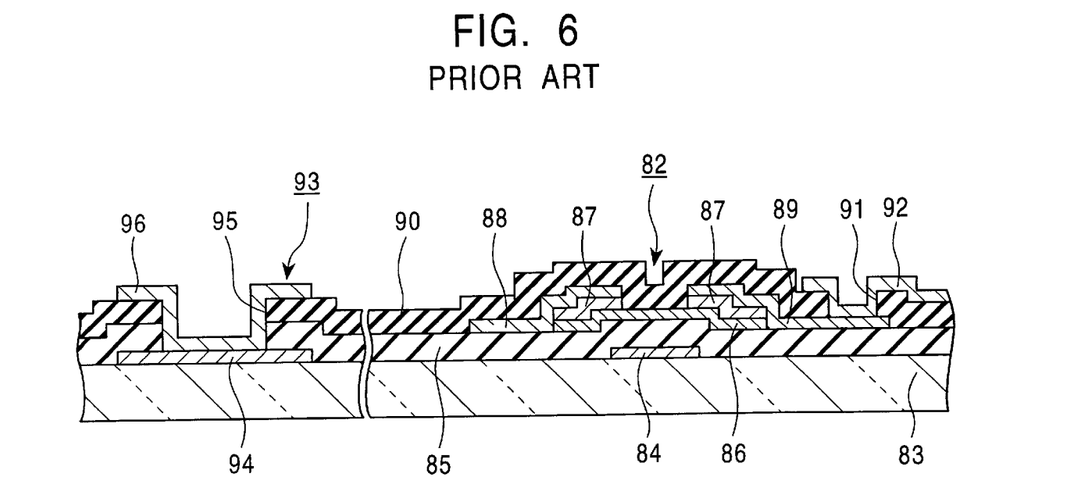
FIG. 6 is a schematic diagram illustrating a thin-film transistor of a type widely used in thin-film transistor liquid crystal display devices.

FIG. 6 is a schematic diagram illustrating a thin film transistor of a type widely used in thin-film transistor liquid crystal display devices.

The thin film transistor 82 includes a gate electrode 84 formed on a transparent substrate 83 and a gate insulating film 85 formed over the gate electrode 84. A semiconductor active film 86 made of amorphous silicon (a-Si) is disposed on the gate insulating film 85 formed on the gate electrode 84. Ohmic contact layers 87 made of amorphous silicon (n+-type a-Si) including an n-type impurity such as phosphorus are disposed on the semiconductor active film 86. Source and drain electrodes 88 and 89 are disposed on the semiconductor active film via the respective ohmic contact layers 87 and they extend into areas on the gate insulating film 85. A passivation film 90 is formed in such a manner as to cover the thin-film transistor 82 composed of the source electrode 88, the drain electrode 89, the gate electrode 84, and other elements. A contact hole 91 is formed in the passivation film 90, at a location above the drain electrode 89. There is also provided a pixel electrode 92 made of a transparent conductive film such as indium tin oxide (hereinafter referred to as ITO), which is electrically connected to the drain electrode 89 via the contact hole 91.

A part on the left of FIG. 6 illustrates a cross section of a gate terminal pad 93 of a gate interconnection located outside the displaying area. A lower pad layer 94 is formed on the transparent substrate 83 using the gate interconnection material. A contact hole 95 passing through the gate insulating film 85 and the passivation film 90 is formed at a location above the lower pad layer 94. An upper pad layer 96 is formed of the same transparent conductive film as that used to form the pixel electrode 92 and is electrically connected to the lower pad layer 94 via the contact hole 95. The end of the source interconnection is also formed in a similar structure.

In the thin film transistor, as described above, the transparent conductive film used to form the gate terminal, the source terminal, and the pixel electrode is directly connected to the interconnection metal used to form the gate interconnection, the source interconnection and the drain electrode.

In liquid crystal display devices of the above-described type employing ITO and aluminum as the materials for the transparent conductive film and the interconnection metal, respectively, to achieve low interconnection resistance, if ITO and aluminum are connected directly to each other, then aluminum is oxidized by oxygen contained in ITO. This causes an increase in contact resistance between ITO and aluminum.

A hillock is another problem which occurs when aluminum is used as the interconnection material. The hillock refers to a needle-shaped projection produced on the surface of aluminum. The hillock can extend through an insulating layer formed on aluminum until reaching a conductive layer on the insulating layer. This causes a short circuit and poor electric isolation.

In view of the above, the object of the present invention is to provide a thin-film transistor substrate and a liquid crystal display device using such a thin-film transistor substrate which use aluminum as the interconnection material without causing the above-described two problems, that is, an increase in electric resistance at a contact between aluminum and ITO and a short-circuit or poor electric isolation.

SUMMARY OF THE INVENTION

According to an aspect of the present invention, there is provided a thin-film transistor substrate comprising: a substrate; an underlying metal film disposed on the substrate, the underlying metal film being formed of a metal capable of being electrically connected to an indium tin oxide film used to form a gate terminal, a source terminal, and a pixel electrode; an aluminum film used to form a gate interconnection, a source interconnection, and a drain electrode, the aluminum film being disposed on the underlying metal film; an aluminum oxide film disposed on the aluminum film; an insulating film disposed on the aluminum oxide film; a contact hole formed in the insulating film, the aluminum oxide film, and the aluminum film, the contact hole extending from the surface of the insulating film to the surface of the underlying metal film through the insulating film, the aluminum oxide film, and the aluminum film; and an indium tin oxide film formed on the insulating film and in the contact hole, the indium tin oxide film in the contact hole being electrically connected to the underlying metal film.

In the thin-film transistor substrate, it is required that the gate terminal, the source terminal, the pixel electrode, and other elements formed of the indium tin oxide film be electrically connected to the gate interconnection, the source interconnection, the drain electrode, or other elements formed of the aluminum film. In the present invention, instead of directly connecting the indium tin oxide film and the aluminum film to each other, the indium tin oxide film is indirectly connected to the aluminum film via the underlying metal film in such a manner as described below. The gate interconnection, the source interconnection, and the drain electrode are formed in a two-layer structure consisting of the underlying metal film and the aluminum film, and the contact hole is formed in the insulating film formed on the two-layer structure such that the contact hole further extends through the aluminum film until reaching the underlying metal film. The indium tin oxide film is then formed such that it is connected to the underlying metal film. In this technique, the underlying metal film is formed of a metal capable of being electrically connected to the indium tin oxide film. As a result, the gate terminal, the source terminal, and the pixel electrode are electrically connected to the gate interconnection, the source interconnection, and the drain electrode, respectively.

Metals which may be preferably employed to form the underlying metal film include Mo, Ti, and Cr. For example, when molybdenum is employed, it is possible to obtain a contact resistance between molybdenum and ITO in the range from $10^{-4}$ to $10^{-7}$ $\Omega \cdot cm^2$ which is very low compared with contact resistance of $10^2$ to $10^{-2}$ $\Omega \cdot cm^2$ obtained for contacts between aluminum and ITO.

Furthermore, the aluminum oxide film formed on the surface of the aluminum film serves as a barrier layer which prevents growth of hillocks on the surface of the aluminum film during a heat treatment or the like performed after the formation of the aluminum oxide film. Thus, short circuits and poor electric isolation due to hillocks can be effectively prevented.

As described above, the present invention solves both of the two problems: increase in resistance at a contact between the gate terminal, the source terminal, or the pixel electrode and the gate interconnection, the source interconnection, or the drain electrode; and short circuits and poor electric isolation due to hillocks on the aluminum film. As a result, it is possible to produce a thin-film transistor having good electric characteristics with a high production yield.

The aluminum oxide film may be produced by various methods. One simple method is to oxidize the aluminum film using ozone water. Another simple method is to irradiate the aluminum film with an ultraviolet ray in an oxygen ambient. The above two methods may be combined.

According to another aspect of the invention, there is provided a liquid crystal display device including: a pair of substrates opposing each other; and a liquid crystal disposed between the pair of substrate, wherein one of the substrates is a thin-film transistor substrate according to the technique of the invention described above.

In the liquid crystal display device using the thin film transistor substrate employing aluminum to form low-resistance interconnections, signal voltage drops and signal propagation delays along the interconnections due to interconnection resistance are minimized. Thus, it is possible to easily realize a display device having a large displaying area which needs interconnections extending along long lengths, or a high-density display device which needs thin interconnections.

DESCRIPTION OF THE PREFERRED EMBODIMENTS

The present invention is described in further detail below with reference to embodiments in conjunction with the accompanying drawings. However, note that the invention is not limited to the embodiments described below.

Figure 1:
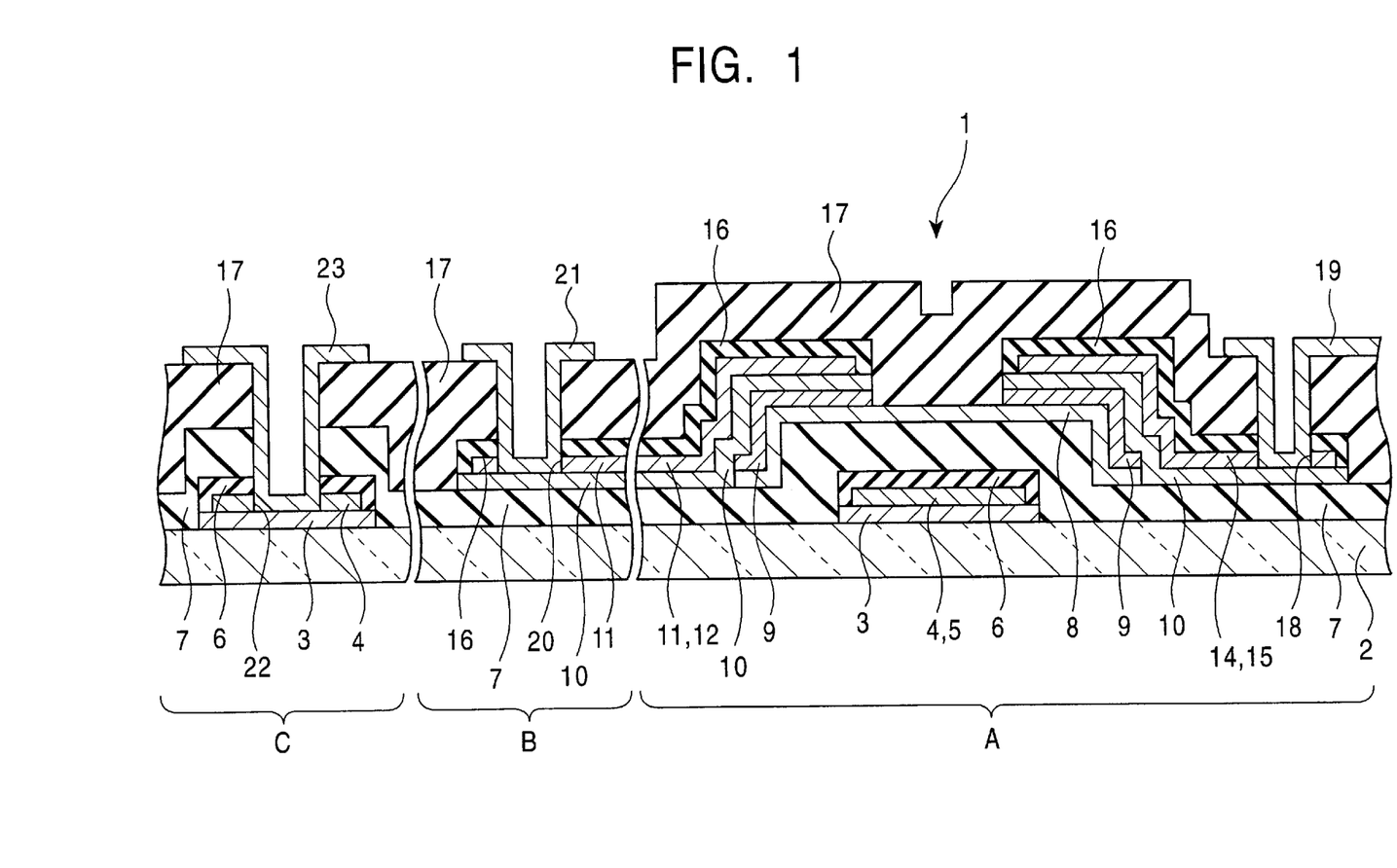
FIG. 1 is a partial cross-sectional view illustrating a thin-film transistor substrate according to an embodiment of the invention.

FIG. 1 is a partial cross-sectional view illustrating a thin-film transistor substrate according to an embodiment of the invention. In FIG. 1, symbol A denotes a thin-film transistor (TFT), symbol B denotes a terminal of a source interconnection located outside a TFT matrix, and symbol C denotes a terminal of a gate interconnection. These three parts denoted by symbols, A, B, and C, are apart from one another in a practical liquid crystal display device, and thus they cannot be represented in a single cross-sectional view. However, for convenience of illustration, they are represented in FIG. 1 as if they were located close to one another.

The thin-film transistor A is described first. The thin-film transistor A includes an underlying metal film 3 formed of molybdenum with a thickness of about 500 Å on a substrate 2, a gate electrode 5 formed of an aluminum film 4 with a thickness of about 2000 Å on the underlying metal film 3, and an aluminum oxide film 6 with a thickness of about 100 Å to 200 Å formed on the gate electrode 5. Furthermore, a gate insulating film 7 is formed over the aluminum oxide film 6, and a semiconductor film of amorphous silicon (a-Si) 8 is formed on the gate insulating film 7. An $n^+$-type a-Si layer 9 is formed on the semiconductor film 8. A source electrode 12 consisting of an underlying metal film 10 made of molybdenum with a thickness of about 200 Å to 500 Å and an aluminum film 11 with a thickness of 1500 Å to 2000 Å is formed on the $n^+$-type a-Si layer 9. A drain electrode 15 consisting of the underlying film 10 and an aluminum film 14 is also formed on the $n^+$-type a-Si layer 9. An aluminum oxide film 16 with a thickness of 100 Å to 200 Å is formed on the aluminum films 11 and 14.

A passivation film (insulating film) 17 is formed over the source electrode 12 and the drain electrode 15. The passivation film 17 has a contact hole 18 which extends through the aluminum oxide film 16 and the aluminum film 14 until reaching the underlying metal film 10. An ITO layer 19 serving as a pixel electrode extends over the inner side wall and the bottom face of the contact hole 18. The drain electrode 15 and the ITO layer (pixel electrode) 19 are electrically connected to each other via the contact hole 18.

In the terminal B of the source interconnection, a lower pad layer consisting of the underlying metal film 10 and the aluminum film 11 is formed on the gate insulating film 7. The aluminum oxide film 16 and the passivation film 17 are formed on the lower pad layer. A contact hole 20 is formed to pass through the above-described two layers. An upper pad layer 21 made of ITO extends over the inner side wall and the bottom face of the contact hole 20. The lower pad layer and the upper pad layer 21 are electrically connected to each other via the contact hole 20.

In the terminal C of the gate interconnection, a lower pad layer consisting of the underlying metal film 3 and the aluminum film 4 is formed on the substrate 2. The aluminum oxide film 6 and the passivation film 17 are formed on the lower pad layer. A contact hole 22 is formed to pass through the above-described two layers. The upper pad layer 23 made of ITO extends over the inner side wall and the bottom face of the contact hole 22. The lower pad layer and the upper pad layer 23 are electrically connected to each other via the contact hole 22.

In the structure described above, the ITO layer and the aluminum layer are connected to each other via the underlying metal film formed of a metal capable of being electrically connected to ITO, and thus no increase in resistance due to direct contact occurs.

The passivation film may be formed of, for example, a-(amorphous) $SiN_x$:H, a-$SiN_x$, a-$SiO_2$:H, or $SiO_2$.

Referring now to FIG. 2, the process of producing the thin-film transistor according to the present embodiment is described below. FIG. 2 illustrates four steps of producing the thin-film transistor part A shown in FIG. 1.

Figure 2A:
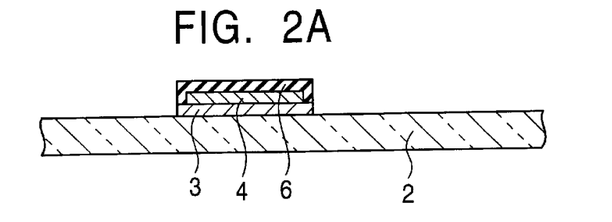
FIG. 2 is a schematic diagram illustrating a production process of the thin-film transistor substrate according to the embodiment of the invention.

First, the underlying film 3 and the aluminum film 4 are formed successively by means of sputtering over the entire surface of the substrate 2. After that, as shown in FIG. 2A, the two films are etched by means of a dry etching process or a combination of dry and wet etching processes so as to form a gate pattern. The surface of the aluminum film 4 is then oxidized to form the aluminum oxide film 6. The oxidization may be performed by a process using ozone water or irradiation of an ultraviolet ray in an oxygen ambient. The oxidization may also be performed by a combination of the above two methods.

Figure 2B:
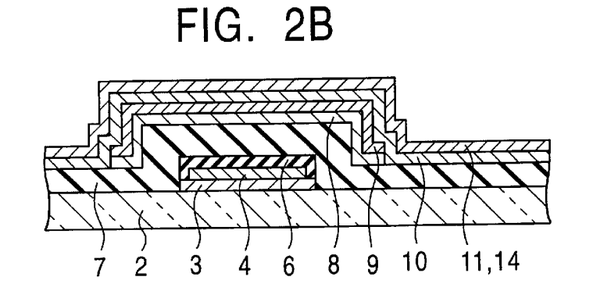

The gate insulating film 7, the semiconductor film 8, and the $n^+$-type a-Si layer 9 are then formed over the entire upper surface of the substrate 2 by means of a CVD technique. The semiconductor film 8 and the $n^+$-type a-Si layer 9 are then etched-such that parts of these film remain on the aluminum oxide film 6 at a location where the channel of the TFT will be formed later. After that, as shown in FIG. 2B, the underlying metal film 10 and the aluminum film 11 (14) are successively formed.

Figure 2C:
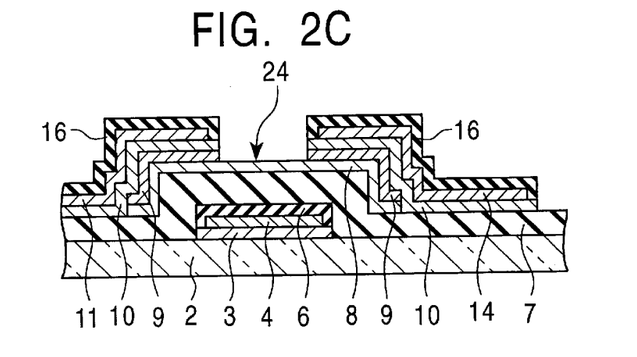

Then, as shown in FIG. 2C, a source/drain pattern is formed by etching the aluminum oxide film 16, the aluminum film 11 (14), and the underlying metal film 10 above the aluminum oxide film 6 by means of a dry etching process or a combination of dry and wet etching processes. The surface of the aluminum film 11 (14) is then oxidized to form the aluminum oxide film 16. The oxidization may be performed by a process using ozone water or by irradiating the aluminum film 11 (14) with an ultraviolet ray in an oxygen ambient. The oxidization may also be performed by a combination of the above two methods.

The $n^+$-type a-Si layer 9 is then etched by means of a dry etching process or a combination of dry and wet etching processes so as to form a channel 24.

Figure 2D:
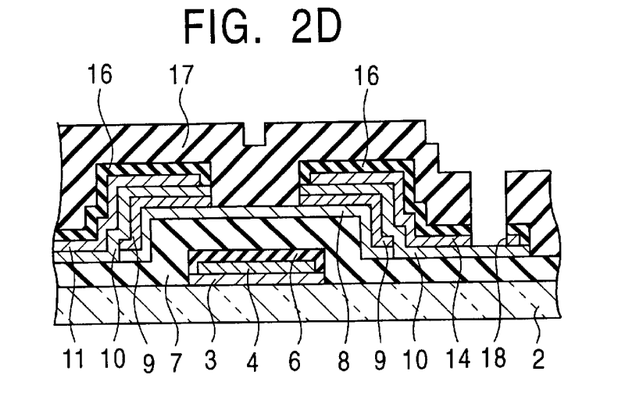

The passivation film 17 is then formed on the aluminum oxide film 16. The passivation film 17, the aluminum oxidation film 16, and the aluminum film 14 are etched by means of a dry etching process or a combination of dry and wet etching processes so as to form the contact hole 18 as shown in FIG. 2D.

After that, ITO is deposited over the entire surface and then patterned so as to form, as shown in FIG. 1, the ITO layer 19 over the bottom face and the inner side wall of the contact hole 18 and partially on the passivation film 17.

Also in terminals B and C of source and gate interconnections, after forming the passivation film 17 on the aluminum oxide films 16 and 6, contact holes 20 and 22 are formed by etching the passivation film 17, the aluminum oxide films 16 and 6, and the aluminum films 11 and 4 by means of dry etching or a combination of dry and wet etching (in the terminal C of the gate,interconnection, the gate insulating film 7 is also etched to form the contact hole 22). After depositing ITO over the entire surface, the ITO layer is patterned so as to form, as shown in FIG. 1, the upper pad layers 21 and 23 over the bottom face and the inner side wall of the contact holes 20 and 22 and partially on the upper surface of the passivation film 17.

The procedure of producing the thin-film transistor substrate according to the present embodiment has been described above.

Figure 3:
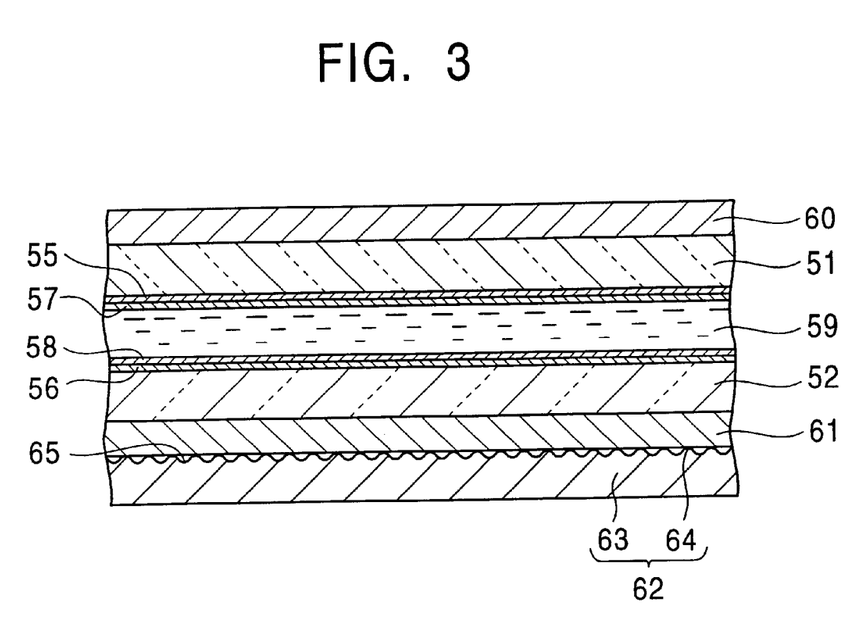
FIG. 3 is a schematic diagram illustrating an example of a reflective type liquid crystal display device using the thin-film transistor substrate according to the embodiment of the invention.

FIG. 3 is a schematic diagram illustrating an example of a reflective type liquid crystal display device using the thin-film transistor substrate according to the present embodiment.

This reflective type liquid crystal display device includes upper and lower glass substrates 51 and 52 opposing each other via a liquid crystal layer 59. An upper transparent electrode layer 55 is disposed on the inner surface of the upper glass substrate 51, and an upper alignment layer 57 is further disposed thereon. A lower transparent electrode layer 56 is disposed on the inner surface of the lower glass substrate 52, and a lower alignment layer 58 is further disposed thereon.

The liquid crystal layer 59 is disposed between the upper and lower alignment layers 57 and 58. An upper polarizer 60 is disposed on the outer surface of the upper glass substrate 51, and a lower polarizer 61 is disposed on the outer surface of the lower glass substrate 52. Reflector 62 is disposed on the outer surface of the lower polarizer 61 such that the irregular surface 65 of a reflecting film 64 faces the lower polarizer 61. The reflector 62 is formed by evaporating aluminum, silver, or similar metal on a polyester film 63 whose one surface is made irregular such that aluminum, silver, or similar metal is deposited on the irregular surface thereby forming the reflecting metal film 64. Thus, the reflector 62 has the irregular surface 65.

In the present reflective type liquid crystal display device, the glass substrate 52 corresponds to the substrate 2 of the thin-film transistor substrate described above, and the lower transparent electrode layer 56 corresponds to the ITO layer (pixel electrode) 19.

The thin-film transistor substrate of the present embodiment has the following advantages. Because the ITO layer is connected to the underlying metal film disposed under the aluminum film, the ITO layer and the aluminum film are electrically connected to each other without causing an increase in contact resistance. Furthermore, the aluminum oxide film formed on the surface of the aluminum film serves as the barrier layer which suppresses growth of hillocks on the surface of the aluminum film. As a result, short circuits and poor electrical isolation due to hillocks are prevented.

Although the present invention has been described above with reference to preferred embodiments, the invention is not limited to the embodiments described above. For example, the thicknesses and shapes of the aluminum film, the aluminum oxide film, the underlying metal film, and the passivation film may be modified without departing from the scope of the invention.

EXAMPLES

The present invention is described in further detail below with reference to specific examples. However, note that the present invention is not limited to these examples.

The effects of the ozone water process and the ultraviolet ray process upon hillocks on the surface of aluminum were experimentally investigated.

Figure 4:
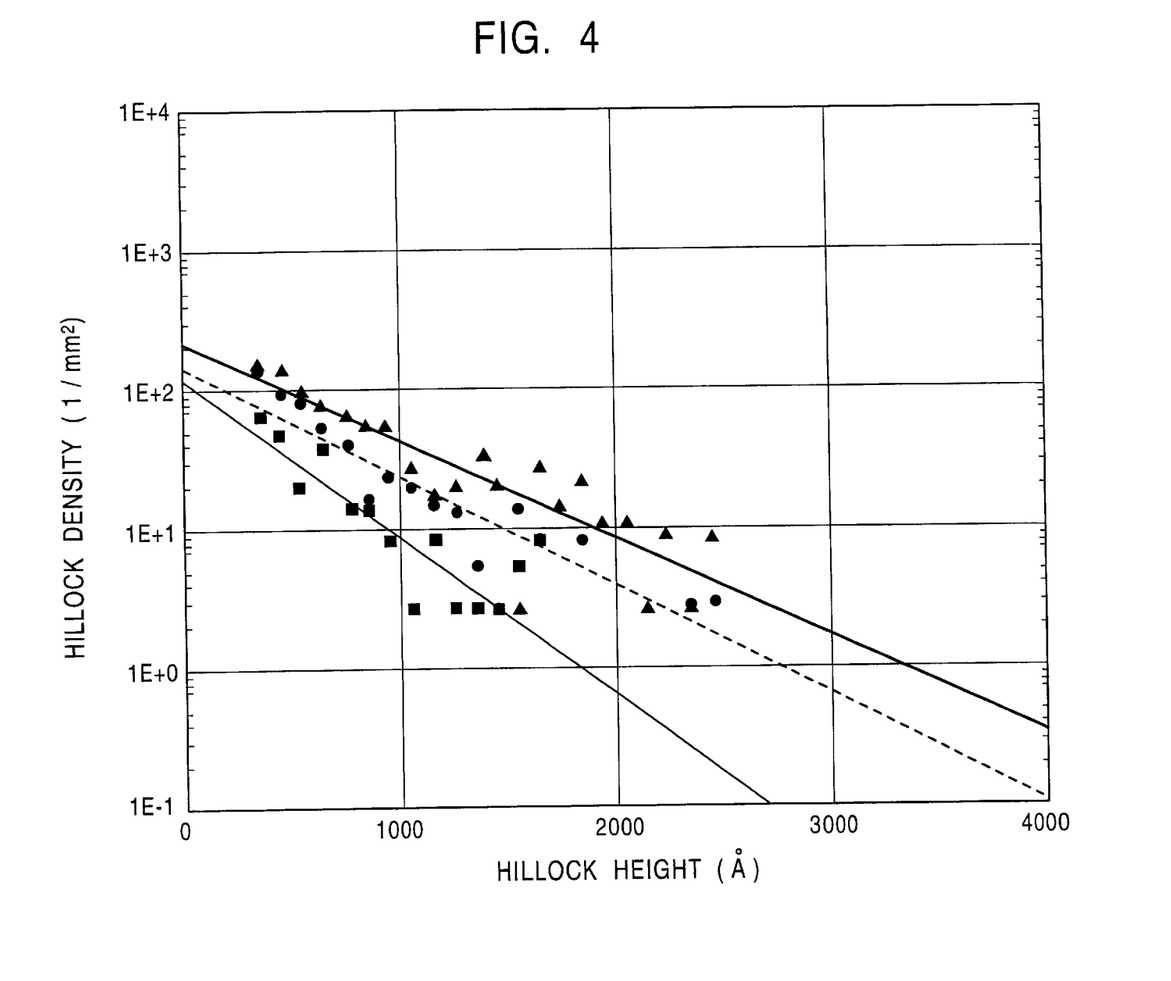
FIG. 4 is a graph illustrating heights and densities of hillocks on an aluminum film subjected to no processing, an aluminum film processed with ozone water, and an aluminum film processed with both ozone water and an ultraviolet ray, respectively.

An aluminum film with a thickness of 1700 Å was deposited on three substrates. Each substrate was then subjected to a heat treatment so as to form hillocks on the surface of the aluminum film. The surface of the aluminum film of one of the three substrates was then treated with ozone water for 5 min, and the surface of the aluminum film of another one of the three substrates was treated with ozone water and an ultraviolet ray for 5 min, thereby forming an aluminum oxide film on these substrates. The remaining one substrate was not subjected to any surface treatment. The heights and densities of hillocks were measured for 512×512 points in an area of 150 μm square by scanning the surface of the aluminum film of each substrate using an atomic force microscope. Results are shown in FIG. 4. In FIG. 4, symbol ▲ and a solid line represent the result associated with the aluminum film which was not subjected to any treatment. Symbol ● and a broken line represent the result associated with the aluminum film which was treated with ozone water for 5 min. Symbol ■ and a thin solid line represent the result associated with the aluminum film which was treated with ozone water and the ultraviolet ray for 5 min.

As can be seen from FIG. 4, the aluminum film subjected to the ozone water process was low in both the hillock height and the hillock density compared with the aluminum film subjected to no processing. The aluminum film subjected to the mixture of the ozone water process and the ultraviolet ray process was still lower in both the hillock height and the hillock density than the aluminum film subjected to only the ozone water process. That is, both the ozone water process and the ultraviolet ray process can form an oxide film on the surface of aluminum and can reduce the size of hillocks. Thus, a smoothed surface can be obtained by either process. Enhanced effects can be obtained by employing a combination of the ozone water process and the ultraviolet ray process.

The effects on the dielectric breakdown voltage obtained by processing the aluminum film with ozone water and an ultraviolet ray were experimentally examined, as described below.

An aluminum film with a thickness of 1300 Å was formed on three substrates. An aluminum oxide film was then formed on the surface of the aluminum film on each substrate by performing a process using ozone water and an ultraviolet ray for 1 min for a first substrate, 5 min for a second substrate, and 20 min for the remaining third substrate. A SiNx layer with a thickness of 1000 Å serving as an insulating layer and then a conductive layer were successively formed on the oxide film of each substrate. Thus, three samples were obtained. The dielectric breakdown voltage between the aluminum film and the conductive layer was measured at a plurality of points of each sample.

Figure 5:
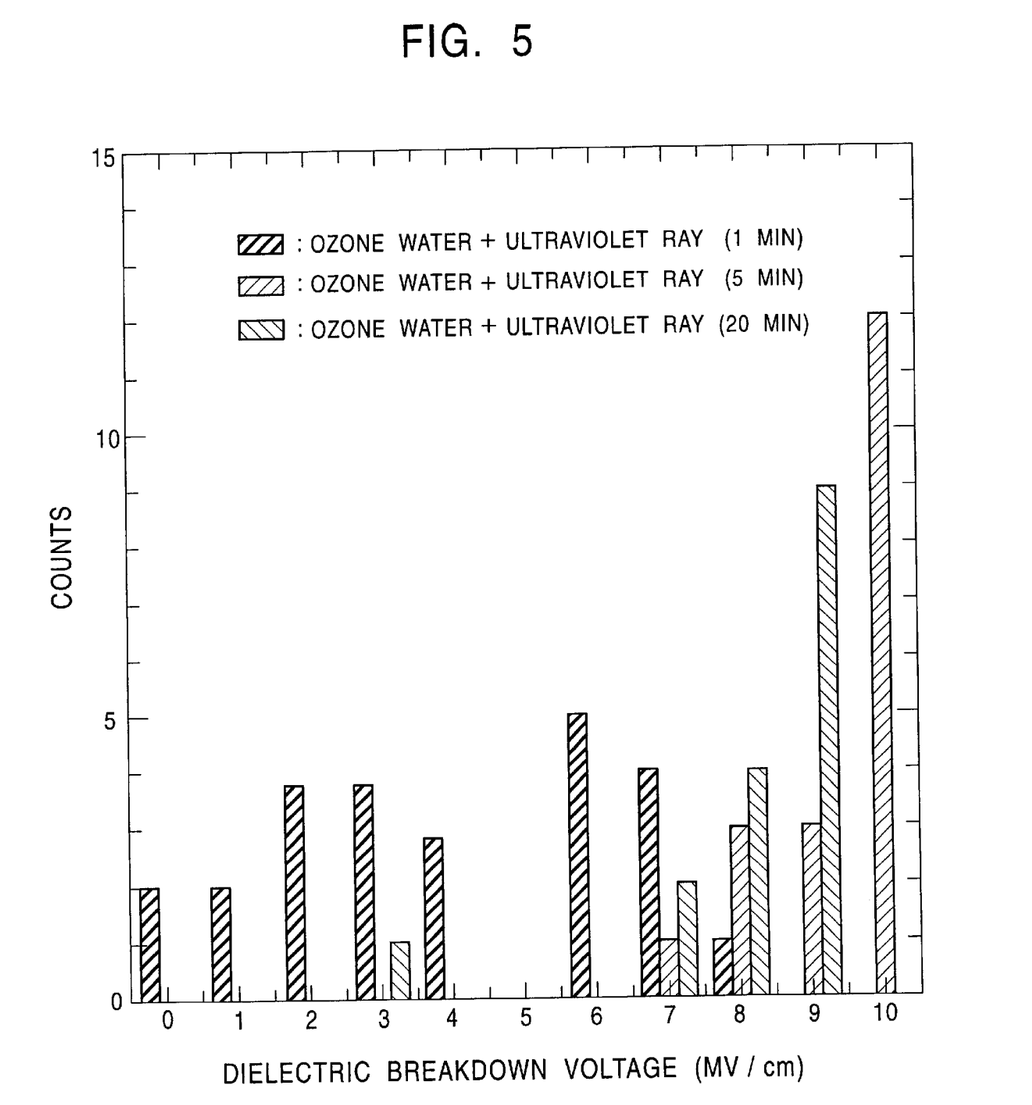
FIG. 5 is a graph illustrating the number of points broken in a breakdown test as a function of voltage applied between the aluminum film and the conductive layer for three samples oxidized under different conditions.

The dielectric breakdown voltages between the aluminum film and the conductive layer and the numbers of points having particular breakdown voltages are plotted in FIG. 5 for the three samples.

The sample subjected to the process using ozone water and the ultraviolet ray for 1 min had a low dielectric breakdown voltage in the range of 0 to 8 V. This indicates that processing for 1 min is insufficient to form an oxide film thick enough to prevent hillocks from growing on the surface of the aluminum film.

In the sample subjected to the process using ozone water and the ultraviolet ray for 5 min, a large number of points had breakdown voltages near 10 V and thus the plot of the breakdown voltage is greatly shifted to right compared to the plot for the sample subjected to the process for 1 min. This means that an oxide film thick enough to prevent growth of hillocks was formed and thus the breakdown voltage of this sample was improved.

On the other hand, the plot of the breakdown voltage for the sample subjected to the process using ozone water and the ultraviolet ray for 20 min is slightly shifted from the plot for the sample subjected to the process for 5 min. This indicates that further processing longer than 5 min does not result in a further improvement in the breakdown voltage of the sample. Instead, a slight reduction in the breakdown voltage results from the further processing.

From the above result, it can be concluded that the optimum processing time of the ozone water/ultraviolet ray process is 5 min to obtain a greatest increase in the dielectric breakdown voltage.

As described above, the present invention has various advantages. That is, in the thin-film transistor substrate according to the invention, the indium tin oxide film is connected to the underlying metal film disposed under the aluminum film so as to ensure that the indium tin oxide film and the aluminum film are electrically connected to each other without having an increase in contact resistance. The aluminum oxide film formed on the surface of the aluminum film serves as the barrier layer which prevents hillocks from growing during a heat treatment performed after the formation of the aluminum oxide film, thereby preventing short circuits and poor electric isolation due to hillocks.

In the liquid crystal display device using the thin film transistor substrate using aluminum to form low-resistance interconnections, signal voltage drops and signal propagation delays along the interconnections due to interconnection resistance are minimized. Thus, it is possible to easily realize a display device having a large displaying area which needs interconnections extending along long lengths, or a high-density display device which needs thin interconnections.

What is claimed is:

1. A thin-film transistor substrate comprising:

a substrate;

an underlying metal film disposed on said substrate, said underlying metal film electrically connected to an indium tin oxide film used to form a gate terminal, a source terminal, and a pixel electrode and having a lower oxidation rate when in contact with indium tin oxide than an oxidation rate of aluminum when in contact with indium tin oxide;

an aluminum film used to form a gate interconnection, a source interconnection, and a drain electrode, said aluminum film being disposed on said underlying metal film;

an aluminum oxide film disposed on said aluminum film;

an insulating film disposed on said aluminum oxide film on the gate interconnect and disposed under at least one of the source interconnection and drain electrode;

a passivation film disposed on the insulating film over the gate interconnect and disposed on the aluminum oxide film of the at least one of the source interconnection and drain electrode;

a first contact hole formed in said passivation film, said insulating film, said aluminum oxide film, and said aluminum film, said first contact hole extending from a surface of said passivation film to a surface of said underlying metal film of the gate interconnect through said passivation film, said insulating film, said aluminum oxide film, and said aluminum film;

a second contact hole formed in said passivation film, said aluminum oxide film, and said aluminum film, said first contact hole extending from a surface of said passivation film to a surface of said underlying metal film of the at least one of the source interconnect and drain electrode through said passivation film, said aluminum oxide film, and said aluminum film; and an indium tin oxide film formed on said insulating film and in said contact holes, said indium tin oxide film in said contact holes being electrically connected to said underlying metal film.

2. A thin-film transistor substrate according to claim 1, wherein said aluminum oxide film is formed by oxidizing said aluminum film using ozone water.

3. A thin-film transistor substrate according to claim 1, wherein said aluminum oxide film is formed by irradiating said aluminum film with an ultraviolet ray in an oxygen ambient.

4. A liquid crystal display device comprising a pair of substrates opposing each other and a liquid crystal disposed between the pair of substrates, wherein one of the substrates is a thin-film transistor substrate according to claim 1.

5. A thin-film transistor substrate comprising:

a substrate;

an underlying metal film disposed on said substrate, said underlying metal film electrically connected to an indium tin oxide film used to form a gate terminal, a source terminal, and a pixel electrode and having a lower oxidation rate when in contact with indium tin oxide than an oxidation rate of aluminum when in contact with indium tin oxide;

a gate interconnection, a source interconnection, and a drain electrode formed from an aluminum film having a single layer of aluminum, said aluminum film being disposed on said underlying metal film;

an aluminum oxide film disposed on said aluminum film;

an insulating film disposed on said aluminum oxide film;

a contact hole formed in said insulating film, said aluminum oxide film, and said aluminum film, said contact hole extending from the surface of said insulating film to the surface of said underlying metal film through said insulating film, said aluminum oxide film, and said aluminum film; and an indium tin oxide film formed on said insulating film and in said contact hole, said indium tin oxide film in said contact hole being electrically connected to said underlying metal film.

6. A thin-film transistor substrate according to claim 5, wherein no portion of the first aluminum film is in contact with the insulating film.

7. A thin-film transistor substrate according to claim 5, wherein the aluminum oxide film is formed from subjection of an aluminum layer to ozone water and not less than about 5 minutes of exposure to ultraviolet radiation.

8. A liquid crystal display device comprising a pair of substrates opposing each other and a liquid crystal disposed between the pair of substrates, wherein one of the substrates is a thin-film transistor substrate according to claim 5.

9. A thin-film transistor substrate comprising:

a substrate;

a gate electrode formed from a first aluminum film and a first underlying metal film that has a lower oxidation rate when in contact with indium tin oxide than an oxidation rate of aluminum when in contact with indium tin oxide;

a gate interconnection extending from the gate electrode;

a first aluminum oxide film disposed on the first aluminum film;

a gate insulating film disposed on the aluminum oxide film;

a semiconductor film disposed on the gate insulating film;

a source electrode and a drain electrode each disposed on the semiconductor film and formed from a second underlying metal film and a second aluminum film, the first and second underlying metal film being the same metal;

a source interconnection extending from the source electrode;

a second aluminum oxide film disposed on the source and drain electrodes and the source interconnection;

a passivation film disposed on the second aluminum oxide film and the gate interconnection;

a first contact hole formed in the passivation film, the gate insulating film, the first aluminum oxide film and the first aluminum film of the gate interconnection;

second and third contact holes formed in the passivation film, the second aluminum oxide film and the second aluminum film of the drain electrode and source interconnection, respectively;

an indium tin oxide film formed on the passivation film and in the first, second, and third contact holes, the indium tin oxide films in each contact hole contacting one of the first and second underlying metal films, the indium tin oxide in the first, second, and third contact holes forming a gate terminal, a pixel electrode, and a source terminal, respectively.

10. A thin-film transistor substrate according to claim 9, wherein no portion of the first aluminum film is in contact with the gate insulating film.

11. A thin-film transistor substrate according to claim 9, wherein no portion of the second aluminum film is in contact with the passivation film.

12. A thin-film transistor substrate according to claim 9, wherein the first aluminum film is a single layer of aluminum.

13. A thin-film transistor substrate according to claim 9, wherein the second aluminum film is a single layer of aluminum.

14. A thin-film transistor substrate according to claim 9, wherein the aluminum oxide film is formed from subjection of an aluminum layer to ozone water and not less than about 5 minutes of exposure to ultraviolet radiation.

15. A liquid crystal display device comprising a pair of substrates opposing each other and a liquid crystal disposed between the pair of substrates, wherein one of the substrates is a thin-film transistor substrate according to claim 9.

* * * * *